(12) United States Patent
Döring

(10) Patent No.: US 8,409,517 B2
(45) Date of Patent: *Apr. 2, 2013

(54) SULFUR-RESISTANT EXHAUST GAS AFTERTREATMENT SYSTEM FOR THE OXIDATION OF NO

(75) Inventor: Andreas Döring, Munich (DE)

(73) Assignee: MAN Nutzfahrzeuge AG, Munich (DE)

( * ) Notice: Subject to any disclaimer, the term of this patent is extended or adjusted under 35 U.S.C. 154(b) by 946 days.

This patent is subject to a terminal disclaimer.

(21) Appl. No.: 12/414,828

(22) Filed: Mar. 31, 2009

(65) Prior Publication Data

US 2009/0255235 A1 Oct. 15, 2009

(30) Foreign Application Priority Data

Apr. 12, 2008 (DE) .......................... 10 2008 018 519

(51) Int. Cl.
*B01D 50/00* (2006.01)
(52) U.S. Cl. ........................................ 422/177; 422/180
(58) Field of Classification Search ................ 422/170, 422/177, 180; 60/295, 297
See application file for complete search history.

(56) References Cited

U.S. PATENT DOCUMENTS

| | | | |
|---|---|---|---|
| 3,824,196 A | 7/1974 | Benbow | |
| 4,170,571 A | 10/1979 | Ritscher | |
| 4,585,632 A | 4/1986 | Schneider | |
| 4,902,487 A | 2/1990 | Cooper | |
| 4,999,173 A | 3/1991 | Kamiyama | |
| 5,017,538 A | 5/1991 | Takeshima | |
| 5,677,258 A | 10/1997 | Kurokawa et al. | |
| 6,805,849 B1 | 10/2004 | Andreasson | |
| 6,928,806 B2 | 8/2005 | Tennison | |
| 7,307,196 B2 * | 12/2007 | Levin et al. ................... | 585/639 |
| 2003/0162650 A1 * | 8/2003 | Marques et al. ................ | 502/64 |
| 2003/0213232 A1 * | 11/2003 | Brisley et al. ................... | 60/285 |
| 2005/0255991 A1 * | 11/2005 | Levin et al. ................... | 502/214 |
| 2006/0177367 A1 | 8/2006 | Li et al. | |
| 2006/0179825 A1 * | 8/2006 | Hu et al. ......................... | 60/297 |
| 2008/0286184 A1 | 11/2008 | Ando et al. | |

FOREIGN PATENT DOCUMENTS

| | | |
|---|---|---|
| DE | 4038054 A1 | 6/1992 |
| DE | 10049119 | 4/2002 |
| EP | 0169939 A2 | 2/1986 |
| EP | 1072765 A2 | 1/2001 |
| EP | 1992409 | 11/2008 |
| JP | 2000230447 A * | 8/2000 |
| WO | WO 0070202 | 11/2000 |
| WO | WO 2005077498 | 8/2005 |
| WO | WO 2006044974 | 4/2006 |

* cited by examiner

*Primary Examiner* — Tom Duong
(74) *Attorney, Agent, or Firm* — Cozen O'Connor

(57) ABSTRACT

An arrangement for aftertreatment of exhaust gas for lean-burn internal combustion engines such as diesel engines and Otto engines with direct injection includes a catalyzer for oxidation of nitrogen monoxide and a molecular sieve which keeps sulfur dioxide away from the catalyzer arranged upstream of the catalyzer.

26 Claims, No Drawings

SULFUR-RESISTANT EXHAUST GAS AFTERTREATMENT SYSTEM FOR THE OXIDATION OF NO

BACKGROUND OF THE INVENTION

1. Field of the Invention

The subject matter of the invention is an exhaust gas aftertreatment system for lean-burn internal combustion engines such as diesel engines and Otto engines with direct injection wherein the system has a catalyzer for oxidation of nitrogen monoxide installed in the exhaust gas train.

2. Description of the Related Art

In order to adhere to the legally prescribed limits on exhaust gas, virtually all lean-burn internal combustion engines have been outfitted in the meantime with catalytic aftertreatment systems such as:

$NO_X$ storage catalyzers
SCR catalyzers, or
particulate filters.

In all of these systems, nitrogen dioxide ($NO_2$) is an important component in the reactions taking place in the aftertreatment system.

The powerful oxidizing agent $NO_2$ is formed at catalyzers, usually containing platinum, for oxidizing nitrogen monoxide (hereinafter: NO oxidation catalyzers) by means of oxygen which is contained in the exhaust gas and formed from the nitrogen monoxide emitted by the engine.

$$2NO+O_2 \Leftrightarrow 2NO_2 \quad (1)$$

The problem with these NO oxidation catalyzers is that the maximum $NO_2$ proportions that can be achieved are limited thermodynamically at high temperatures. As a result, in contrast to other exhaust gas catalyzers, the desired conversions will decrease again at high temperatures after an increase at low temperatures and there will not be a pronounced plateau-like conversion maximum.

The SCR (Selective Catalytic Reduction) method is an established means for reducing nitrogen oxides. SCR catalyzers have been used for many years in the energy industry and more recently also in internal combustion engines. A detailed exposition of these methods is given in DE 34 28 232 A1. $V_2O_5$-containing mixed oxides, e.g., in the form of $V_2O_5/WO_3/TiO_2$, can be used as SCR catalysts. $V_2O_5$ proportions typically range between 0.2% and 3%.

In practical applications, ammonia or compounds which split off ammonia such as urea or ammonia formiate are used in solid form or in solution as reductants. One mole of ammonia is needed to convert one mole of nitrogen monoxide.

$$4NO+4NH_3+O_2 \Rightarrow 4N_2+6H_2O \quad (2)$$

For the decomposition of the reductant, the exhaust gas temperature, particularly after the internal combustion engine is started or when the internal combustion engine is operated in the lower output range, is too low to generate ammonia without the occurrence of problematic byproducts.

In connection with the decomposition of urea (($NH_2)_2CO$) in ammonia ($NH_3$), it is known that this takes place under optimal conditions (temperatures above 350° C.) in two steps. First, thermolysis, i.e., the thermal decomposition, of urea takes place according to the following reaction:

$$(NH_2)_2CO \Rightarrow NH_3+HNCO \quad (3)$$

This is followed by hydrolysis, that is, the catalytic decomposition, of isocyanic acid (HNCO) into ammonia ($NH_3$) and carbon dioxide ($CO_2$) according to the following reaction:

$$HNCO+H_2O \Rightarrow NH_3+CO_2 \quad (4)$$

When the reductant is in aqueous form such as in a eutectic urea solution (trade name: AdBlue), for example, this water must also evaporate prior to and during the actual thermolysis and hydrolysis.

If the temperatures during the above-mentioned reaction (3) and (4) are below 350° C. or if heating is only gradual, it is known from DE 40 38 054 A1 that chiefly solid, infusible cyanuric acid is formed through trimerization of the isocyanic acid formed in (5):

$$3\,HNCO \underset{>350°\,C.}{\overset{<350°\,C.}{\rightleftarrows}} (HNCO)_3 \quad (5)$$

leading to clogging of the SCR catalyzer downstream. As is stated in DE 40 38 054, cited above, this problem can be remedied by guiding the exhaust gas flow charged with the reductant through a hydrolysis catalyzer. Thus, the exhaust gas temperature at which a quantitative hydrolysis is first possible can be brought down to 160° C. The construction and composition of a corresponding catalyzer is likewise described in the above-cited publication as is the construction and operation of a SCR catalyzer system outfitted with a hydrolysis catalyzer.

When a platinum-containing NO oxidation catalyzer for forming $NO_2$ is positioned in front of the SCR catalyzers $$2NO+O_2 \Leftrightarrow 2NO_2 \quad (1)$$

the SCR reaction can be substantially accelerated and the low temperature activity is noticeably increased.

$$NO+2NH_3+NO_2 \Rightarrow 2N_2+3H_2O \quad (6)$$

In this connection, it must be ensured that the $NO_2$ proportion of the total nitrogen oxides does not exceed 50% because this would lead to a decrease in the $NO_x$ conversion.

Nitrogen oxide reduction using the SCR method in internal combustion engines operating in vehicles is difficult because of the changing operating conditions, which makes it difficult to apportion the reductant in terms of quantity. On the one hand, the highest possible conversion of nitrogen oxides must be achieved; but on the other hand emission of unspent ammonia must be prevented. This problem is often solved by using an ammonia blocking catalyzer downstream of the SCR catalyzer to convert the excess ammonia to nitrogen and water vapor. Further, the use of $V_2O_5$ as active material for the SCR catalyzer leads to problems when the exhaust gas temperature at the SCR catalyzer is above 650° C. because the $V_2O_5$ is then sublimated.

Particle separators, as they are called, or particulate filters are used in power plants and in vehicles to minimize fine particles. A typical arrangement with particle separators for use in vehicles is described, for example, in EP 1 072 765 A1. Arrangements of this kind differ from those using particulate filters in that the diameter of the channels in the particle separator is substantially greater than the diameter of the largest occurring particle, while the diameter of the filter channels in particulate filters is in the range of the diameter of the particles. Due to this difference, particulate filters are prone to clogging, which increases the exhaust gas back pressure and reduces engine performance. An arrangement and a method with particulate filters are shown in U.S. Pat. No. 4,902,487. A distinguishing feature of the two above-mentioned arrangements and methods is that the oxidation catalyzer—usually a catalyzer with platinum as active material—arranged upstream of the particle separator or particulate filter oxidizes the nitrogen monoxide in the exhaust gas by means of the residual oxygen that is also contained to form nitrogen dioxide which is converted in turn in the particle separator or particulate filter with the carbon particles to form CO, $CO_2$, $N_2$ and NO. In this way, a continuous removal of the deposited solids particles is carried out. Accordingly, regeneration cycles that must be carried out uneconomically in other arrangements are dispensed with.

  (7)

  (8)

  (9)

In order to meet future exhaust gas regulations, it will be necessary to use arrangements for reducing nitrogen oxide emissions and arrangements for reducing fine particles emissions at the same time. Various arrangements and methods are already known for this purpose.

U.S. Pat. No. 6,928,806 describes an arrangement including an oxidation catalyzer, a SCR catalyzer arranged downstream of the latter in the exhaust gas flow, and a particulate filter which is arranged downstream of the latter in the exhaust gas flow. The reductant for the selective catalytic reaction taking place in the SCR catalyzer is fed back immediately in front of the SCR catalyzer by a urea injection device that is controlled as a function of the operating parameters of the internal combustion engine. A disadvantage in this arrangement is that the nitrogen dioxide generated in the oxidation catalyzer is substantially completely consumed by the selective catalytic reduction in the SCR catalyzer; that is, it is no longer available for the conversion of the solids particles that have accumulated in the particulate filter arranged downstream. Therefore, the regeneration of the particulate filter must be carried out uneconomically through cyclical heating of the exhaust gas flow by enriching the exhaust gas flow with unconsumed hydrocarbons. This is accomplished either by enriching the combustion mixture or by injecting fuel in front of the particulate filter. On the one hand, an arrangement of this kind for regenerating the particulate filter is elaborate and therefore expensive. On the other hand, the cyclical regeneration of the particulate filter situated at the end of the arrangement produces harmful substances again which can no longer be removed from the exhaust gas.

U.S. Pat. No. 6,805,849 discloses another combination of a particulate filter and an arrangement for selective catalytic reduction. The arrangement described therein includes an oxidation catalyzer in the exhaust gas flow which increases the proportion of nitrogen dioxide in the exhaust gas, a solids filter arranged downstream, a reservoir for the reducing liquid, an injection device for the reducing liquid which is arranged behind the solids filter, and an SCR catalyzer downstream of the latter in the exhaust gas flow.

When an $NO_x$ storage catalyzer is used, the combustion changes constantly between overstoichiometric combustion and substoichiometric combustion. In the lean operating phases, the nitrogen oxides are stored in the form of nitrates which are reduced to nitrogen in the rich operating phases by means of carbon monoxide and hydrocarbons. The storage in the form of nitrate proceeds by way of $NO_2$ which accumulates in the form of nitrate on the barium or calcium storage components.

As was already mentioned, the $NO_2$ needed for the reactions described above is formed at NO oxidation catalyzers usually containing platinum. In actual engine operation, however, sulfurization of the NO oxidation catalyzers due to sulfur contained in the fuel and/or in the engine oil poses a problem. Owing to the combustion, $SO_2$ is formed from this sulfur and is oxidized at the NO oxidation catalyzers downstream to form $SO_3$.

  (10)

  (11)

In this connection, it has been shown that the amount of $SO_3$ which is formed and the amount of $NO_2$ which is formed are directly related; this means that a catalyzer forming large amounts of $NO_2$ generates large amounts of $SO_3$ at the same time.

This $SO_3$ forms sulfates with the metal-containing catalyzer washcoat or sulfuric acid with water which is adsorbed on the surface.

  (12)

Both lead to a covering of the active centers of the catalyzer and, therefore, to decreased activity. A regeneration of the catalyzers can be carried out by increasing the exhaust gas temperatures to greater than 500° C., but this temperature is rarely achieved in normal vehicle operation, especially when an exhaust gas turbocharger is used. Further, the active temperature increase is usually connected to an increase in fuel consumption.

SUMMARY OF THE INVENTION

Proceeding from the prior art described above, it is an object of the invention to prevent the deactivation of catalyzers forming $NO_2$ due to sulfur compounds while overcoming the disadvantages of known methods.

The basic idea is to prevent $SO_2$ from coming into contact with the active centers of the NO oxidation catalyzer so as to prevent formation of $SO_3$ and, consequently, formation of sulfuric acid and/or sulfates.

To this end, a molecular sieve is arranged or applied, e.g., as a layer, upstream of and/or on the NO oxidation catalyzer. The pores of the molecular sieve through which the reactants from the flow of gas must diffuse at the surface of the catalyzer are designed in such a way that they are smaller than the molecular diameters of $SO_2$ but larger than the molecular diameters of NO, $NO_2$ and $O_2$. Accordingly, the molecules necessary for the reaction at the catalyzer can reach the catalyzer located downstream of the molecular sieve and/or below the molecular sieve, while the $SO_2$ responsible for the formation of $SO_3$ can be kept away from the NO oxidation catalyzer by the molecular sieve owing to steric effects. This works because the molecules NO, $NO_2$ and $O_2$ relevant for the formation of $NO_2$ have diameters of 1.5 Å to 3 Å, while the diameters for $SO_2$ are in the range of 7 Å, i.e., the pore diameters of the molecular sieve are therefore advantageously selected between 3 Å and 6 Å.

Platinum has proven to be a very active component for the oxidation of NO. Palladium may also be added in order to increase thermal stability. However, since palladium has only a slight NO oxidation activity, the NO conversion of Pt—Pd mixtures decreases as the proportion of palladium increases in comparison to simple Pt—NO oxidation catalyzers.

The molecular sieve can be arranged as a molecular sieve layer directly on the NO oxidation catalyzer or on a carrier arranged upstream of the NO oxidation catalyzer so as to achieve the necessary stability for the desired small layer thicknesses in an advantageous manner.

The defined pore diameters of the molecular sieve can be implemented relatively simply through the use of zeolites. Different lattice constants, structures and, therefore, pore diameters can be generated through the specific arrangement of $Al_4$- and $SiO_4$-tetrahedra. Further, the use of silicates, metal silicates, aluminates, metal aluminates, silicophosphates, metal silicophosphates, silicoaluminophosphates, aluminophosphates, metal aluminophosphates, and aluminum silicates for the molecular sieve is advantageous.

It must be taken into account when selecting a suitable type of molecular sieve that while the selectivity between $SO_2$ and the rest of the exhaust gas components increases as the pore diameter decreases, the diffusion of NO, $NO_2$ and $O_2$ on or from the active centers is made more difficult at the same time, which can impair the NO conversion. Since the influence of pore diffusion on the conversions increases as temperature increases, different pore diameters and therefore different types of molecular sieve can be used for different cases of temperature applications. EDI-type molecular sieves have especially small pore diameters up to and including 3 Å, while ABW, AEI, AFR, AWW, BIK, CHA, -CLO, KFI, LTA, NAT, PAU, RHO, -RON, THO types have pore diameters up to and including 4 Å. Pore diameters up to and including 5 Å are achieved when using AFT, ATT, ATV, BRE, CAS, -CHI, DAC, DDR, GIS, GOO, HEU, JBW, LEV, MON, PHI, WEN and YUG types. Pore diameters up to and including 6 Å are achieved when using APC, EAB, EPI, ERI, EUO, FER, LAU, MEL, MER, MFI, MFS, MTT, MTW, NES and TON types.

The above-mentioned designations conform to the IZA (International Zeolite Association) nomenclature.

When the molecular sieve is constructed as a zeolite, particularly small pore diameters up to and including 3 Å are achieved in edingtonite-type zeolites, while pore diameters up to and including 4 Å are achieved in Li-A, bikitaite, chapazite, cloverite, ZK-5, zeolite A, natrolite, paulingite, roggianite, and thomsonite types. Pore diameters up to and including 5 Å are achieved when using brewsterite, chiavennite, dachiardite, gismondine, goosecreekite, heulandite, Na-J, levyne, montesommaite, phillipsite, wenkite and yugawaralite types. Pore diameters up to and including 6 Å are achieved in TMA-E, epistilbite, erionite, EU-1, ferrierite, laumontite, ZSM-11, merlionite, ZSM-5, ZSM-57, ZSM-23, ZSM-12, NU-87 and theta-1 types.

AlPO-18 (AEI), AlPO-22 (AWW), AlPO-52 (AFT), AlPO-12-TAMU (ATT), AlPO-25 (ATV) and AlPO-C (APC) can be used as aluminophosphates, and SAPO-40 (AFR) can be used as silicoaluminophosphate.

The types of molecular sieve, zeolite, aluminophosphate and silicoaluminophosphate mentioned above can advantageously be used individually or in any combination as molecular sieve material.

The average layer thickness of the molecular sieve or molecular sieve layer should be at least 3 Å. Since the molecules NO, $NO_2$ and $O_2$ necessary for NO oxidation must first diffuse through the molecular sieve layer, the NO conversions may be limited especially at high temperatures due to pore diffusion. Therefore, the average thickness of the molecular sieve or molecular sieve layer should not exceed 5 µm so that the influence of pore diffusion is not increased unnecessarily. In contrast, the layer thickness of the catalyzer layer in a catalyzer realized by means of coating or extrusion is usually between 5 µm and 500 µm.

To improve the conversion at the NO oxidation catalyzer, it is useful to integrate the metals, such as platinum and palladium, acting as active components in a zeolite matrix, particularly the MFI and/or BEA and/or FAU type(s). However, it must be ensured that the molecular sieve or molecular sieve layer does not have any components, particularly platinum, generating $SO_3$ or at least has a smaller amount of such components than the actual NO oxidation catalyzer because NO oxidation and $SO_2$ oxidation usually take place in parallel.

The production of zeolite-containing catalyzers is described in U.S. Pat. No. 5,017,538, U.S. Pat. No. 4,999,173 and U.S. Pat. No. 4,170,571 and is therefore familiar to the person skilled in the art.

The zeolite type of the catalyzer and of the molecular sieve or molecular sieve layer may be identical or different depending on the application.

The catalyzers can be produced by extrusion or by coating a ceramic or metal substrate. Extrusion usually results in honeycomb catalyzers with parallel flow channels (U.S. Pat. No. 3,824,196), whereas with metal catalyzer substrates the shape and orientation of the flow channels can be freely selected to a great extent.

After the drying and/or calcination of the catalyzers, the molecular sieve layer is formed in another work step. Two different methods may be chosen for this purpose:

For one, it is possible to arrange a molecular sieve layer in a manner similar to the coating of substrates with a catalyzer washcoat. This layer must then be dried and calcinated similar to the catalyzers to ensure a stable and solid connection between the molecular sieve layer and catalyzer. When zeolites are used for the molecular sieve layer, the coating can be carried out by means of a zeolite-containing suspension. The average thickness of a layer applied in this way is usually in the range of 0.5 µm to 5 µm.

When large amounts of hydrocarbons are contained in the exhaust gas, they can deposit on the molecular sieve layer and/or in the pores of the molecular sieve layer, cause coking and lead to clogging of the sieve layer. For this reason it is useful to integrate additional active components in the molecular sieve layer which enable oxidation of hydrocarbons. These active components include palladium, ruthenium, iridium, rhodium, tungsten, titanium, lanthanum, molybdenum, cerium, and/or manganese. When the elements are integrated in a zeolite structure, the sublimation temperatures are increased considerably owing to the high steam pressures within the pore structure, so that it is even possible to use vanadium in the molecular sieve layer up to 750° C.

Another possibility for preventing coking of the molecular sieve pores is to arrange a catalyzer for oxidation of hydrocarbons upstream of the molecular sieve and/or on the side of the molecular sieve facing the hydrocarbon-containing exhaust gas. As was already described referring to the molecular sieve, it can be arranged on the molecular sieve as a catalyzer layer in another work step. Active components include palladium, ruthenium, iridium, rhodium, tungsten, titanium, lanthanum, molybdenum, cerium, and/or manganese.

Another possibility for forming the molecular sieve layer, particularly when using zeolite-containing, exchanged catalyzers, is to substitute the concentration of at least one metal at the catalyzer surface with a different ion having only a low $SO_3$-forming activity, or none at all, through ion exchange. In the simplest case, this is accomplished by introducing an acidic fluid. In so doing, the metal ions in the zeolite structure are replaced by protons from the acidic fluid.

Since hydrogen-containing zeolites have low stability, the protons should subsequently be exchanged for metal cations with a low $SO_3$-forming activity and/or a high hydrocarbon-oxidizing activity. As was already described above, the elements palladium, ruthenium, iridium, rhodium, tungsten, titanium, lanthanum, molybdenum, cerium, manganese, or vanadium can be used for this purpose. Further, nonmetal cations can also be used. Depending on the affinity of these elements, the intermediate step of protonization can be omitted and the metals can be directly exchanged through selection of a suitable pH. Extremely thin constructions are made possible by means of molecular sieve layers produced through ion exchange. Their average layer thickness is usually between 3 Å and 1 μm.

Another possibility for reducing the structural space of the exhaust gas aftertreatment components is to coat the particulate filter with catalyzer material for oxidation of NO and/or hydrocarbons and to provide a molecular sieve layer, for example, by impregnation, ion exchange or coating. However, it must be ensured that free flow channels are still available inside the particulate filter after coating in order to avoid unnecessarily high exhaust gas back pressure. Therefore, the exhaust gas flow within the filter structure should flow past, not through, the molecular sieve pores so that the reactants only penetrate into the molecular sieve pores by means of diffusion processes analogous to the processes at catalyzer substrates described above and accordingly reach the underlying catalyzer layer. This can be achieved, for example, by a high porosity of the catalyzer layer. A high porosity of this kind can be generated, for example, by mixing filler into the washcoat, which filler evaporates during calcination, or by mixing in zeolite-free, highly-porous washcoat additives or zeolite types with a high porosity and/or large pore diameter. Another possibility with respect to highly porous filter substrates would be to carry out a thin coating of filter material with the catalyzer material that does not completely cover or close the filter substrate so that flow channels that are still sufficiently free remain inside the filter substrate. When the molecular sieve layer is formed subsequently, it must be ensured that this molecular sieve layer does not close the free flow channels but only lies upon the freely accessible surfaces of the catalyzer layer as a thin layer. This can be carried out in an advantageous manner in zeolite-containing catalyzers by means of the ion exchange at the surface of the catalyzer as was already described above. As was also already stated, it must be ensured that the pore diameter of the molecular sieve is selected in such a way that the large $SO_2$ molecules cannot pass the molecular sieve layer, but the smaller, harmless exhaust gas constituents like oxygen, nitrogen, carbon dioxide, nitrogen oxides, water, and carbon monoxide may pass through. If it is not possible to produce the molecular sieve layer on the catalyzer by pure ion exchange, the catalyzer can be coated with molecular sieve material separately.

The particulate filter on which the catalyzer layer is arranged with the molecular sieve layer arranged thereon can advantageously be made of sintered metal and/or ceramic and/or filter foam and/or ceramic fibers and/or quartz fibers and/or glass fibers and/or silicon carbide and/or aluminum titanate.

The solution described above presents a particularly economical, space-saving and, therefore, advantageous possibility for a durable combination of the molecular sieve layer and the catalyzer layer for generating $NO_2$ and/or the catalyzer layer for oxidation of hydrocarbons on a catalyzer substrate and/or on a particulate filter so that they cannot be separated from one another without being destroyed.

Naturally, it is also possible to arrange the molecular sieve, NO oxidation catalyzer and/or the catalyzer for oxidation of hydrocarbons on separate structural component parts with all of the exhaust gas being guided through the pores of the molecular sieve. However, this would result in an appreciably higher exhaust gas back pressure than is the case in the solutions described above. When the molecular sieve is arranged separately upstream of the NO oxidation catalyzer, it must be ensured that the exhaust gas is free from solid particles such as soot, for example, because otherwise the molecular sieve pores would become clogged. This is achieved, for example, by arranging the molecular sieve downstream of a particulate filter and upstream of the NO oxidation catalyzer. In an arrangement of this kind, the molecular sieve can also be arranged as a layer on the outlet side of the particulate filter so that the molecular sieve and the particulate filter form a unit that cannot be separated without being destroyed. In this case, the coating is carried out so that the pores of the particulate filter on its outlet side are completely closed by the molecular sieve so that the exhaust gas must flow through the pores of the molecular sieve. However, for this purpose, especially with high concentrations of hydrocarbons in the exhaust gas, it is usually necessary that the molecular sieve have a hydrocarbon oxidation activity and/or that a catalyzer for oxidation of hydrocarbons be arranged upstream of the molecular sieve and/or on its inlet side because otherwise the molecular sieve pores would become blocked by unburned hydrocarbons. As was already described above, possible active components include palladium, ruthenium, iridium, rhodium, tungsten, titanium, lanthanum, molybdenum, cerium or manganese.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

I claim:

1. Apparatus for after-treatment exhaust gas in the exhaust gas line of a lean-burn internal combustion engine, the exhaust gas line having an input and an output, the apparatus comprising:
    a catalyzer having at least one active component for oxidation of nitrogen monoxide; and
    a molecular sieve arranged upstream of the catalyzer, the molecular sieve configured to prevent sulfur dioxide from reaching the catalyzer.

2. The apparatus of claim 1 wherein the molecular sieve is a molecular sieve layer on the catalyzer.

3. The apparatus of claim 1 further comprising a carrier arranged upstream of the catalyzer, the molecular sieve being provided as a molecular sieve layer on the carrier.

4. The apparatus of claim 1 wherein the at least one active component contains at least one of platinum and palladium.

5. The apparatus of claim 1 wherein the catalyzer comprises a zeolite having active components embedded therein.

6. The apparatus of claim 5 wherein the zeolite is at least one of types MFI, BEA, and FAU.

7. The apparatus of claim 1 wherein the molecular sieve comprises at least one of zeolites, silicates, metal silicates, aluminates, metal aluminates, silicophosphates, metal silicophosphates, silicoaluminophosphates, aluminophosphates, metal aluminophosphates, and aluminum silicates.

8. The apparatus of claim 1 wherein the molecular sieve has lattice structures of at least one of types EDI, ABW, AEI, AFR, AWW, BIK, CHA, -CLO, KFI, LTA, NAT, PAU, RHO, -RON, THO, AFT, ATT, ATV, BRE, CAS, -CHI, DAC, DDR, GIS, GOO, HEU, JBW, LEV, MON, PHI, WEN, YUG, APC, EAB, EPI, ERI, EUO, FER, LAU, MEL, MER, MFI, MFS, MTT, MTW, NES, and TON.

9. The apparatus of claim 1 wherein the molecular sieve comprises zeolites of at least one of types edingtonite, Li-A, bikitaite, chapazite, cloverite, ZK-5, zeolite A, natrolite, paulingite, roggianite, thomsonite, brewsterite, chiavennite, dachiardite, gismondine, goosecreekite, heulandite, Na-J, levyne, montesommaite, phillipsite, wenkite, yugawaralite, TMA-E, epistilbite, erionite, EU-1, ferrierite, laumontite, ZSM-11, merlionite, ZSM-5, ZSM-57, ZSM-23, ZSM-12, NU-87, and theta-1.

10. The apparatus of claim 1 wherein the molecular sieve comprises aluminophosphates of at least one of types AlPO-18, AlPO-22, AlPO-52, AlPO-12-TAMU, AlPO-25, and AlPO-C.

11. The apparatus of claim 1 wherein the molecular sieve comprises silicoaluminophosphate SAPO-40.

12. The apparatus of claim 1 wherein the molecular sieve has oxidation activity for hydrocarbons.

13. The apparatus of claim 1 further comprising a catalyzer for the oxidation of hydrocarbons arranged upstream of the molecular sieve.

14. The apparatus of claim 13 wherein at least one of the molecular sieve and the catalyzer for oxidation of hydrocarbons contain at least one of palladium, ruthenium, iridium, tungsten, titanium, lanthanum, molybdenum, cerium, manganese, vanadium, and rhodium.

15. The apparatus of claim 13 wherein the catalyzer for the oxidation of nitrogen monoxide, the molecular sieve layer, and the catalyzer for the oxidation of hydrocarbons are fixed to each other and cannot be separated without being destroyed.

16. The apparatus of claim 13 further comprising a particulate filter, wherein at least one of the catalyzer for the oxidation of nitrogen monoxide, the molecular sieve layer, and the catalyzer for the oxidation of hydrocarbons are arranged on the particulate filter.

17. The apparatus of claim 1 wherein the molecular sieve has a concentration of at least one active component for the oxidation of nitrogen monoxide that is lower than the concentration of said at least one active component in the catalyzer.

18. The apparatus of claim 17 wherein the catalyzer has a concentration of platinum that is higher than the concentration of platinum in the molecular sieve layer.

19. The apparatus of claim 1 wherein the molecular sieve layer has a concentration of at least one of palladium, ruthenium, iridium, tungsten, titanium, lanthanum, molybdenum, cerium, manganese, vanadium, and rhodium that is higher than the concentration of at least one of palladium, ruthenium, iridium, tungsten, titanium, lanthanum, molybdenum, cerium, manganese, vanadium, and rhodium in the catalyzer.

20. The apparatus of claim 1 further comprising a particulate filter having an outlet side, wherein the molecular sieve layer is arranged on the outlet side.

21. The apparatus of claim 1 wherein the molecular sieve has free passages therethrough with a diameter between 3 Å and 6 Å.

22. The apparatus of claim 1 wherein the molecular sieve has a thickness between 3 Å and 5 µm.

23. A method for producing an apparatus for after-treatment exhaust gas in the exhaust gas line of a lean-burn internal combustion engine, the method comprising: producing a catalyzer having at least one active component for oxidation of nitrogen monoxide by one of extrusion and coating a substrate; and providing a molecular sieve layer arranged upstream of the catalyzer, the molecular sieve layer configured to prevent sulfur dioxide from reaching the catalyzer.

24. The method of claim 23 further comprising arranging a catalytic layer on the molecular sieve layer, the catalytic layer having at least one active component for oxidation of hydrocarbons.

25. The method of claim 23 wherein the catalyzer has a surface with a metal-exchanged zeolite material, and wherein the molecular sieve layer is produced through ion-exchange of at least one active metal in the surface with one of a metal having no SO2 oxidation activity and nonmetallic cations.

26. The method of claim 23 wherein the catalyzer has a surface with a metal-exchanged zeolite material, and wherein the molecular sieve layer is produced through ion-exchange of at least one active metal in the surface with one of a metal having no SO2 oxidation activity but a high hydrocarbon oxidation activity.

* * * * *